(12) United States Patent
Deng et al.

(10) Patent No.: US 12,297,999 B2
(45) Date of Patent: May 13, 2025

(54) LENS PLATE AND A LIGHTING DEVICE HAVING THE LENS PLATE

(71) Applicant: SIGNIFY HOLDING B.V., Eindhoven (NL)

(72) Inventors: Lan L Deng, Shanghai (CN); Li L Wang, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/022,290

(22) PCT Filed: Aug. 17, 2021

(86) PCT No.: PCT/EP2021/072811
§ 371 (c)(1),
(2) Date: Feb. 21, 2023

(87) PCT Pub. No.: WO2022/038122
PCT Pub. Date: Feb. 24, 2022

(65) Prior Publication Data
US 2023/0324028 A1    Oct. 12, 2023

(30) Foreign Application Priority Data

Aug. 21, 2020 (WO) ................ PCT/CN2020/110567
Oct. 15, 2020 (EP) .................................... 20202021

(51) Int. Cl.
*F21V 5/00* (2018.01)
*F21Y 115/10* (2016.01)

(52) U.S. Cl.
CPC .............. *F21V 5/007* (2013.01); *F21V 5/004* (2013.01); *F21Y 2115/10* (2016.08)

(58) Field of Classification Search
CPC ....... F21V 5/004; F21V 5/007; F21Y 2115/10
See application file for complete search history.

(56) References Cited

U.S. PATENT DOCUMENTS

| 2010/0110660 A1* | 5/2010 | Brukilacchio ....... B60Q 1/2611 362/231 |
| 2010/0165619 A1 | 7/2010 | Kawato et al. |
| 2015/0003061 A1* | 1/2015 | Brukilacchio ..... G01N 21/8806 362/237 |
| 2020/0067264 A1* | 2/2020 | Guo .................... H01S 5/02257 |

FOREIGN PATENT DOCUMENTS

| CN | 202259431 U | 5/2012 |
| CN | 103574497 A | 2/2014 |
| CN | 108266703 A | 7/2018 |
| WO | 2019182073 A1 | 9/2019 |

OTHER PUBLICATIONS

Chang, Sung-Il, et al., "Microlens Array Diffuser for a Light-Emitting Diode Backlight System," Optics Letters, vol. 31, No. 20, Oct. 2006 (3 Pages).

* cited by examiner

*Primary Examiner* — Thomas M Sember (57) ABSTRACT

A lens plate has an array of convex lenses each having a top portion which forms a light input surface for facing a light source and a base which forms a light exit surface. Each convex lens has a height H and a diameter D at the base, wherein H/D>0.85. The lens plate for example has a height from the base of the convex lenses to the top portions in the range 1.5 mm to 5 mm.

12 Claims, 6 Drawing Sheets

LENS PLATE AND A LIGHTING DEVICE HAVING THE LENS PLATE

CROSS-REFERENCE TO PRIOR APPLICATIONS

This application is the U.S. National Phase application under 35 U.S.C. § 371 of International Application No. PCT/EP2021/072811, filed on Aug. 17, 2021, which claims the benefit of International Patent Application No. PCT/CN2020/110567, filed on Aug. 21, 2020 and European Patent Application No. 20202021.0, filed on Oct. 15, 2020. These applications are hereby incorporated by reference herein.

FIELD OF THE INVENTION

This invention relates to a lens plate, for example for shaping the light output from an array of LEDs, as part of a luminaire.

BACKGROUND OF THE INVENTION

There is a desire for some types of luminaire to create uniform lighting, namely with a relatively constant light intensity over an area in a (horizontal) plane beneath the luminaire.

This requires a light output intensity which has a function with respect to emission angle such that light from large emission angles has a larger light intensity (since it has further to travel to the illumination plane. An example of a desirable light output intensity distribution is a so-called batwing intensity distribution.

It is known to use lenses, or a lens plate, to convert the output light intensity distribution from a light source, such as a Lambertian light intensity distribution of a LED light source, to the desired batwing intensity distribution.

Currently, concavo-convex lenses have been used to create large beam angles for such uniform lighting.

Figure 1:
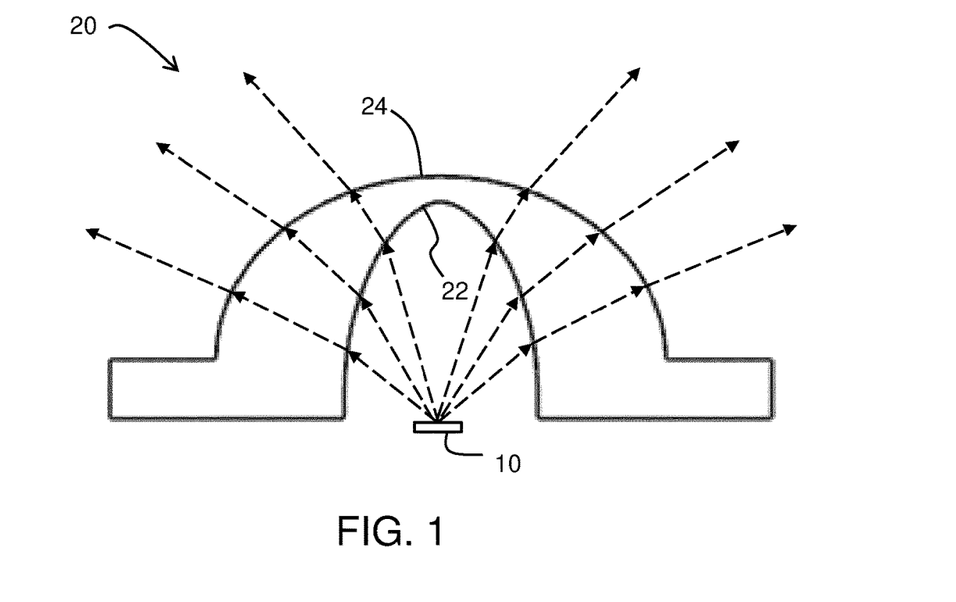
FIG. 1 shows a typical concavo-convex lens and a ray tracing diagram.

A typical concavo-convex lens and its ray tracing diagram is shown in FIG. 1.

FIG. 1 shows a LED source 10 with a lens 20 over the light output surface. The lens 20 has a concave light entry surface 22 and a convex light exit surface 24. This type of lens is usually employed with a one-to-one correspondence between an LED chip and the lens, or there may be a set of LED chips beneath the lens. If this correspondence between the lens and the LEDs is not provided, the desired optical performance is difficult to achieve.

Figure 2:
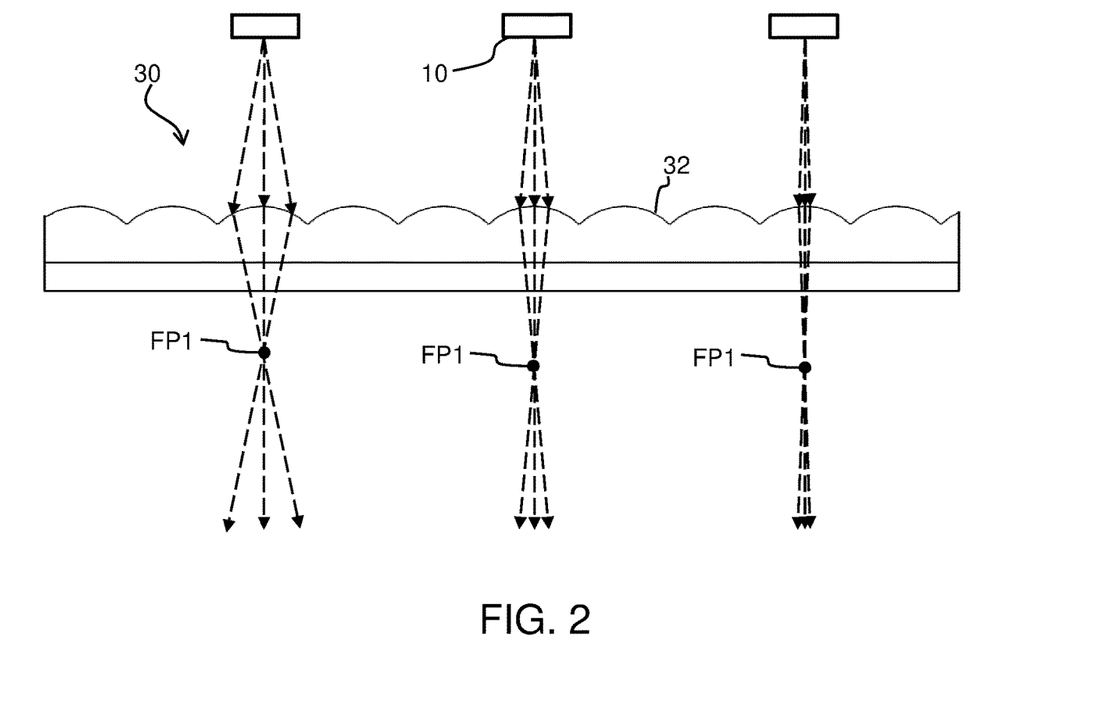
FIG. 2 shows an alternative design of a lens plate, formed as an array of convex spherical microlenses.

FIG. 2 shows an alternative design of a lens plate 30, formed as an array of convex spherical microlenses 32. This type of lens design is able to tolerate different alignments between the lens plate and the light source, by virtue of the small size of the microlenses. It also achieves better color uniformity, but the output beam angle is not significantly different to the native light source.

FIG. 2 shows the light traces for three LED light sources 10. It can be seen that the desired wide beam light output is not achieved, and the output beam width matches the input beam width. The focal point FP1 of the microlenses is on the opposite side of the lens plate to the LED light source, at approximately the same distance from the lens surface as the LED light source.

There remains a need for a lens structure which is suitable for multiple types of LED light source, is not sensitive to the relative position of the light source to the lens structure, and which achieves the desired wide beam output, e.g. a batwing light intensity distribution.

SUMMARY OF THE INVENTION

The invention is defined by the claims.

According to examples in accordance with an aspect of the invention, there is provided a lens plate comprising:
an array of convex lenses, each convex lens having a top portion which forms a light input surface for facing a light source and a base which forms a light exit surface, wherein the base is positioned on or defines a substrate common to the array,
wherein each convex lens has a height H and a diameter D at the base, wherein H/D>0.85. The lens plate for example has a height from the base of the convex lenses to the top portions in the range 1.5 mm to 5 mm. It's preferable that the height H of the convex lenses is in the range of 1 mm to 4 mm.

The convex lenses of this lens plate have a tall and thin bullet shape as a result of the height to diameter ratio. The convex lenses are thus aspheric and they have a very short focal length. For a lens plate with spherical lenses, i.e. with H/D=0.5, the output beam angle is not significantly different to the light source beam (near axial rays remain near axial). The bullet-shaped lenses, with H/D>0.85, result in a focus point located inside of the lens body, and this means the divergence of near-axial rays is very significant. Off-axial rays also remain off-axial, with the result that a batwing light output intensity may be obtained from the Lambertian output of a LED light source.

The lens plate enables the light output characteristics to be insensitive to the position of the lens plate over the light source, e.g. an LED array. The same lens structure is also suitable for different light source designs.

Each convex lens preferably has a focal point between the top portion and the base. The top portion of each lens thus focuses to a focal point with a very short focal distance, such that the focal point is within the lens body. A large angle of convergence, and hence divergence after the focal point, is thus provided, and this means off-axial rays are emitted from the base with a large angle.

The lens plate may further comprise a microstructure formed at a central region of each top portion.

The convex lenses of the array and the microstructures each make the light emitted from the light source more disperse. The central microstructure on the convex top part of each convex lens diffuses small angle rays from the light source.

Each microstructure is preferably diffusive or scattering. This provides the desired dispersion of the small angle rays from the light source.

Each microstructure may comprise:
an array of microlenses; or
an embossed pattern; or
an arrangement of embedded particles.

Thus, there are various possible designs for the microstructure.

The base of each convex lens and the common substrate are preferably flat. Thus, the optical function is in this case defined entirely by the top side facing the light source, and the lens plate is simple to manufacture with no alignment requirements between the top and bottom faces.

The top portion of each convex lens for example forms a projection which is rotationally symmetric about an optical axis.

The lenses of the array of convex lenses preferably fully occupy an active area of the lens plate. By filling the active area of the lens plate, all light to be processed passes through the lenses. The active area is the area of the lens plate intended for beam shaping the light output from a light source.

The lenses for example have a pitch in the range 0.5 mm to 5 mm. This provides a small lens pitch which assists in making the the light output insensitive to the alignment between the lens plate and the light source.

The bases of the convex lenses preferably merge together. The merged lens bases enable the active area of the lens plate to be fully covered as mentioned above and enable a small pitch array of the top portions.

Each convex lens may have a section curve which comprises:
an oval line;
a Bezier curve;
a parabola; or
a polynomial aspherical curve.

The lens plate preferably comprises a molded component.

The invention also provides a lighting device comprising:
an array of LEDs; and
the lens plate defined above, wherein a light output surface of each LED of the array of LEDs faces the top portions of the convex lenses of the lens plate.

The LED array for example has a pitch between the LEDs in the range 0.5 mm to 3 mm.

A distance along the optical axis between the light output surface of the LEDs and the top portion of the convex lenses is for example in the range 3 mm to 7 mm. This spacing allows thermal conditions to be met.

When the lens plate comprises a microstructure formed at a central region of each top portion (as explained above), the microstructure may extend over an area which subtends a half angle in the range 10 to 15 degrees from a point on a plane of the output surfaces of the LEDs, along the optical axis of the associated convex lens.

When the incident subtended angle is more than this half angle (e.g. 12 degrees), the angle of the departure ray will increase sharply. An incident ray from a neighboring LED will hit the side of the convex lens away from the microstructure (again with incident angle more than this half angle) and this will lead for example to a 60 to 80 degree angle of departure.

The lighting device may satisfy:
less than 15% of the light from the LED array exit with an angle in the range 0 to 30 degrees;
more than 70% of the light from the LED array exit with an angle in the range 30 to 70 degrees; and
5% to 20% of the light from the LED exit with an angle in the range 70 to 90 degrees.

Thus, the light output distribution adopts a batwing shape with the maximum light intensity in the range 30 to 60 degrees.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lens plate having an array of convex lenses each having a top portion which forms a light input surface for facing a light source and a base which forms a light exit surface. Each convex lens has a height H and a diameter D at the base, wherein H/D>0.85.

Figure 3:
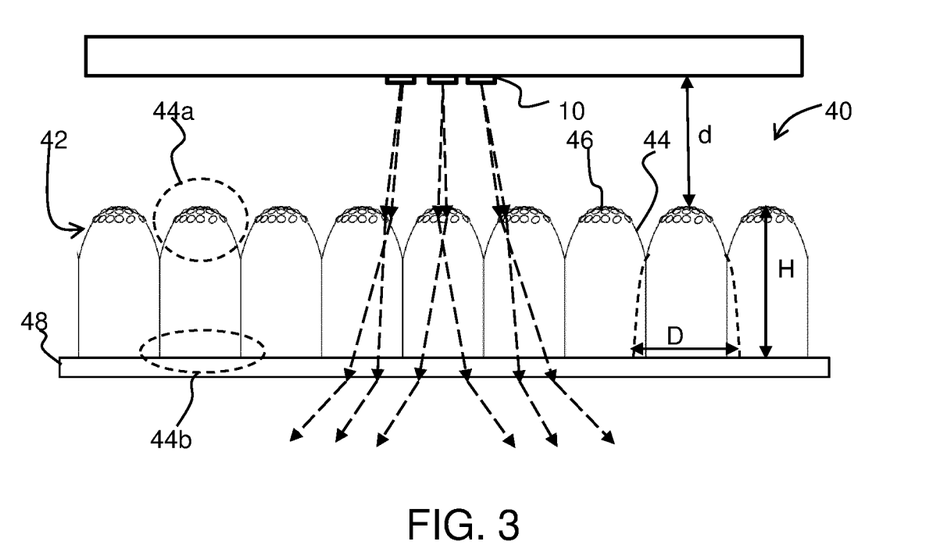
FIG. 3 shows a lens plate in accordance with an example of the invention.

FIG. 3 shows a lens plate 40 in accordance with an example of the invention. The lens plate comprises an array 42 of convex lenses 44. Each convex lens 44 has a top portion 44a which forms a light input surface for facing a light source and a base 44b which forms a light exit surface. The bases are flat and are mounted over, or formed integrally with, a common flat substrate 48. The light source is an array of LEDs 10, and a light output surface of each LED of the LED array faces the top portions 44a of the convex lenses of the lens plate.

The convex lenses thus have a beam shaping surface only on one side (the side facing the light source 10) making them easy to manufacture, for example by injection molding. The convex lenses have aspherical surfaces. In particular, the curvature of the top portions 44a corresponds to a shape having a height H and a diameter D at the base, wherein H/D>0.85.

As shown in FIG. 3, and as discussed in more detail below, the convex lenses may merge together at their bases. In such a case, the diameter D will be defined by the extrapolation of the remaining convex lens surface area. The convex lenses may instead be separate from each other (either spaced apart or tangentially in contact), in which case the diameter is the actual diameter at the base. When the individual lenses are separate, they preferably have a spacing of less than 0.1 mm to minimize the size of the flat voids between the lenses.

The extrapolation will comprise a smooth extension to the remaining convex lens surface area, i.e. the top portion 44a of a lens. Curve extrapolation methods are well known to derive a general overall shape of the convex lens from the top portion 44a. From this extrapolation, the diameter D can be defined.

The extrapolation takes account of the type of lens shape. By way of example, the section curve of the convex lenses for example comprises:
    an oval line;
    a Bezier curve;
    a parabola; or
    a polynomial aspherical curve.

For these lens shapes, the generatrix is a parabola, Bezier curve, arc, hyperbola, or a combination of these.

When the bases of the lenses do merge together, the convex lenses of the array of convex lenses then fully occupy an active area of the lens plate. In particular, the bases of the lenses merge together to define a solid plate with no gaps. This avoids voids between the lenses which function a a flat plate. Furthermore, the merged bases mean that there are no vertical cylindrical sidewalls of the lenses, and these vertical sidewalls are not desired for the intended ray deflection. The convex lenses for example form a square grid. The top portion of each convex lens forms a projection which is rotationally symmetric about an optical axis of the lens, and this projection extends towards the light source from the merged bases.

The lenses may instead be formed as a hexagonal grid.

The convex lenses of are thus tall and thin as a result of the height to diameter ratio. The convex lenses thereby have a very short focal length in particular with a focal point located inside of the lens body. This means the divergence of near-axial rays is very significant as shown by the rays in FIG. 3.

Off-axial rays remain off-axial, with the result that a batwing output intensity may be obtained from the Lambertian output of a LED light source.

FIG. 3 shows an optional additional design feature, of a microstructure 46 formed at a central region of each top portion 44a. Each microstructure 46 is diffusive or scattering. Any suitable structure may be used such as an array of microlenses, or an embossed pattern, or an arrangement of embedded particles.

Both the convex lens design and the microstructure make the light emitted from the light source more diffuse. The microstructure diffuses the small angle rays from the light source 10, and the other part of the convex surface of the convex lenses is used to control the large angle rays to achieve a desired target wide angle. The structure thus enhances the large angle rays and diminishes the central small angle light from the light source 10.

The total height of the whole lens plate (H and the thickness of the substrate 48) is for example in the range 1.5 mm to 5 mm, for example around 3 mm. It's preferable that the height H of the convex lenses is in the range of 1 mm to 4 mm. The perpendicular distance d between the LED light source 10 and the top of the convex lenses 44 is for example in the range 3 mm to 7 mm, for example around 5 mm. This is favorable for meeting thermal conditions of the lenses.

FIG. 3 shows schematically that the pitch of the LEDs does not need to be the same as the pitch of the convex lenses. Indeed, the lens plate may be used with different light source arrangements, with different LED pitch, and the relative alignment between the lens plate and the light source is not critical.

FIG. 3 shows rays which pass through the microstructured areas. It shows that they are focused within the body of the convex lenses (regardless of whether or not there is a microstructure) so that the light exits the lens with a wide beam angle. Thus, the small angle rays are refracted to form large angle rays.

Figure 4:
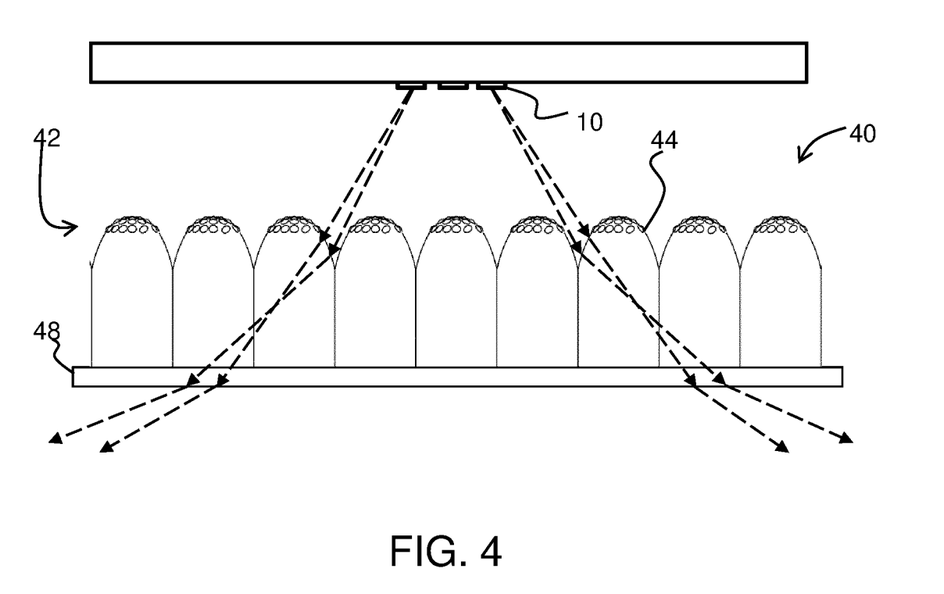
FIG. 4 shows the same lens plate as FIG. 3 but shows rays which pass through other parts of the convex lenses.

FIG. 4 shows the same lens plate but shows rays which pass through other parts of the convex lenses. This applies to light from the light source already with large ray angles (relative to the normal, optical axis direction). These large angle rays are also refracted to form larger beam angles.

Thus, the structure achieves a wide beam angle light distribution suitable for uniform lighting.

Figure 5:
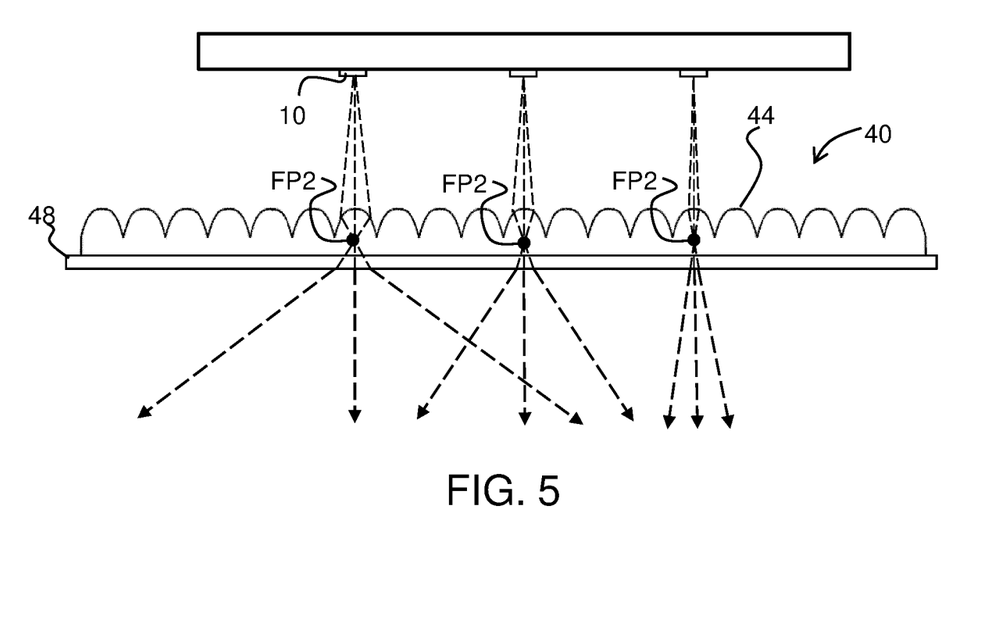
FIG. 5 shows the optical performance for a convex lens design without the microstructures, for small angle incident beams.
Figure 6:
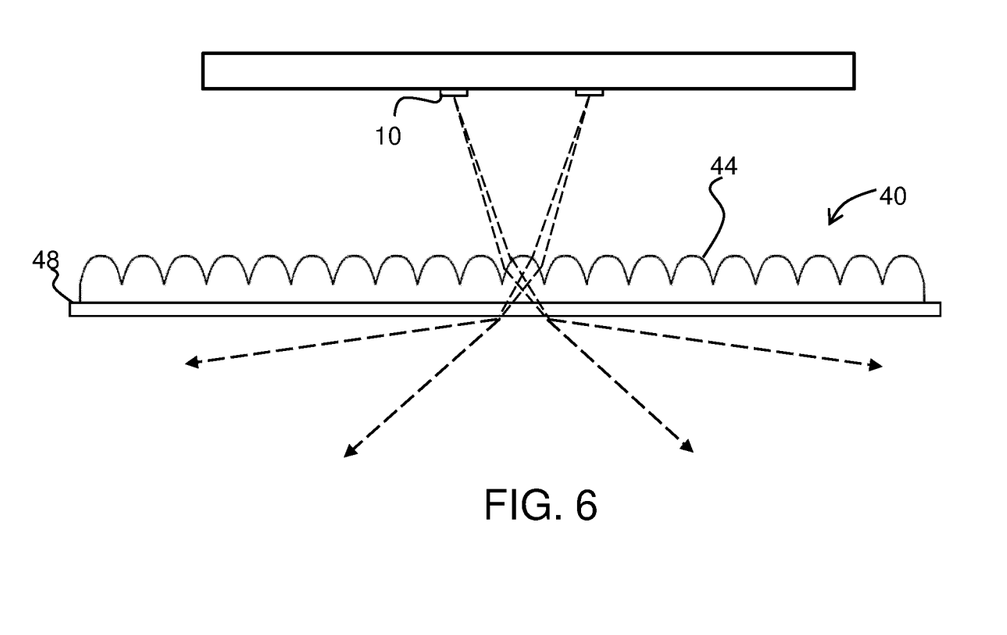
FIG. 6 shows the optical performance for a convex lens design without the microstructures, for large angle incident beams.
Figure 7:
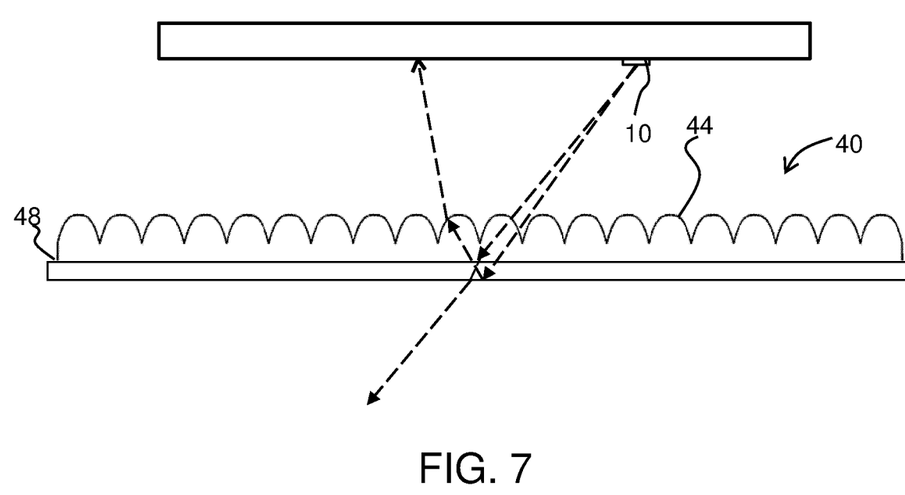
FIG. 7 shows how input light from a light source with an even larger angle of incidence to the lens plate is again converted to output light with a larger beam angle.

FIGS. 5 to 7 show the optical performance for a convex lens design without the microstructures.

FIG. 5 shows how input light from a light source with three different incident beam angles, but centered on the optical axis, is in each case converted to output light with a larger beam angle, in the same way as explained above.

FIG. 5 shows that the design of the convex lens is such that the focal point FP2 is within the lens body, i.e. it is at a distance from the lens surface along the optical axis which is less than the lens height. Thus, the focal point is within the lens plate. The focal point of a lens is defined based on incident parallel beams, but the relatively large spacing to the display panel means the light from each LED 10, treated as a point source, is also brought into a focus at a focal point within the lens body. This contrasts with the conventional lens design of FIG. 2, in which the focal point FP1 is beneath the lens plate and outside the body of the lenses. The lens design of the invention provides the large divergence of near axial rays as explained above. Light is convergent before the focal point and then divergent after the focal point. The short focal length provided by the convex lenses of the invention results in a greater deflection of the near axial rays.

FIG. 6 shows how input light from a light source with a large angle of incidence to the lens plate is again converted to output light with a larger beam angle, in the same way as explained above.

FIG. 7 shows how input light from a light source with an even larger angle of incidence to the lens plate is again converted to output light with a larger beam angle, and this may then result in some total internal reflection from the bottom surface of the substrate as shown.

Figure 8:
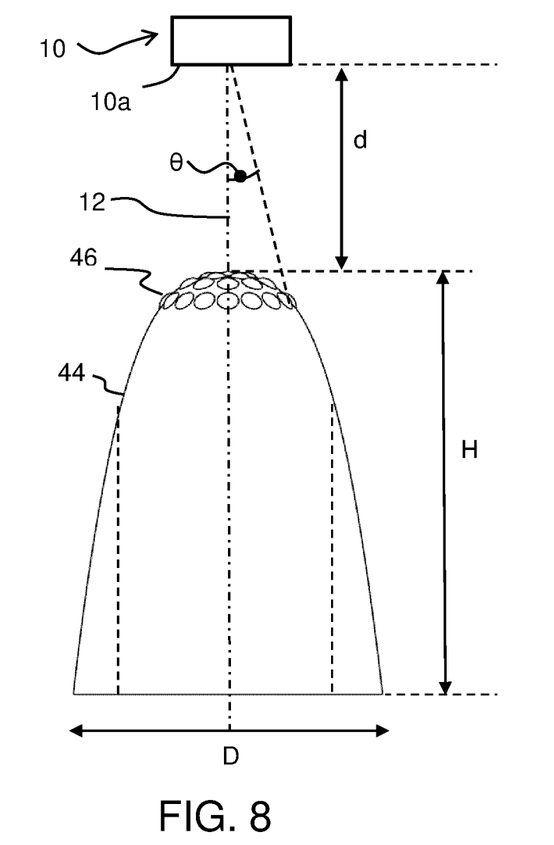
FIG. 8 is used to explain a possible design for the convex lenses.

FIG. 8 is used to explain a possible design for the convex lenses, and shows more clearly the dimensions D, H and d discussed above.

In addition, the optical axis of the light output from the light output surface 10a of the light source 10 is shown.

The microstructure extends over an area which subtends a half angle ($\theta$) in the range 10 to 15 degrees about the optical axis, from the plane of the output surfaces 10a of the LEDs 10.

When the incident light is at an angle greater than this half angle, e.g. 12 degrees, the angle of the light ray exiting the base of the lens will increase sharply, for example leading to an exit ray with an angle in the range 60 to 80 degrees to the optical axis.

The resulting optical performance, for illumination by the Lambertian light intensity distribution of an LED array, is for example such that:

less than 15% of the light from the LED array exit with an angle in the range 0 to 30 degrees;
more than 70% of the light from the LED array exit with an angle in the range 30 to 70 degrees; and
5% to 20% of the light from the LED exit with an angle in the range 70 to 90 degrees.

Figure 9:
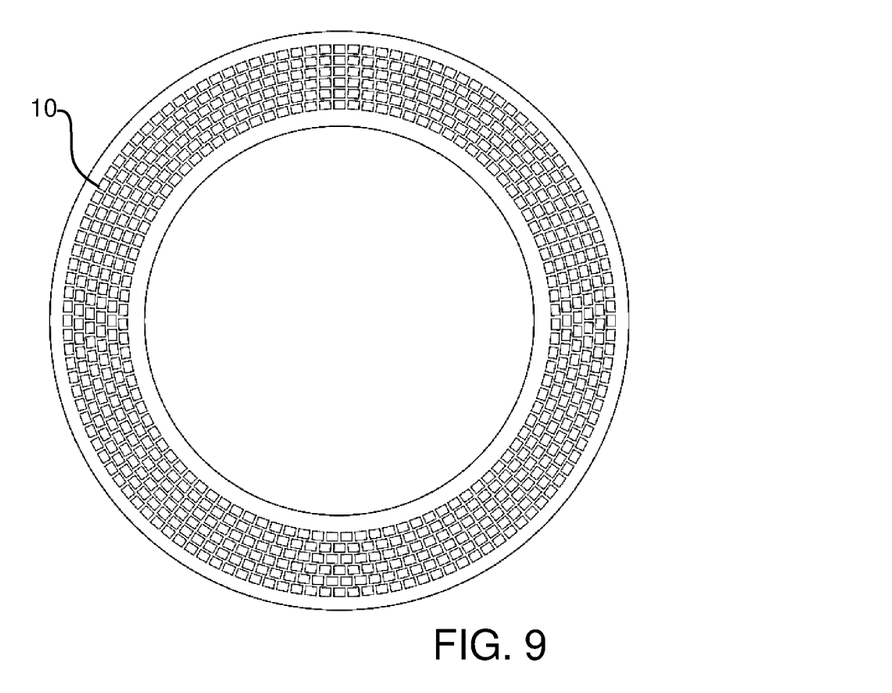
FIG. 9 shows an example of an LED array comprising concentric rings of LEDs.

FIG. 9 shows an example of an LED array comprising concentric rings of LEDs 10. The spacing between LEDs is for example around 1 mm in both the width and height directions to provide thermal separation.

Figure 10:
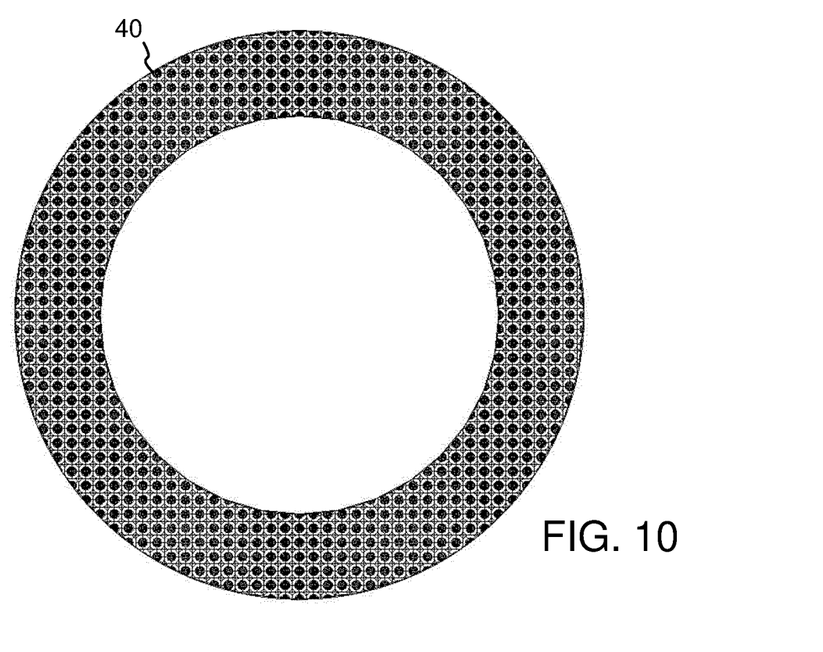
FIG. 10 shows an example of a convex lens array comprising a square grid of lenses.

FIG. 10 shows an example of an array of convex lenses comprising a square grid of lenses 40. Thus, the lens array of the lens plate does not need to be designed to match the design of the LED array, and a same lens plate may be used with different light sources.

The pitch of the LED array and the lens plate does not need to match and the alignment between the two is not critical.

The lenses of the array of convex lenses for example have a pitch in the range 0.5 mm to 5 mm and a base diameter D in the range 0.5 mm to 5 mm. The LED array for example has a pitch in the range 0.5 mm to 3 mm.

The lens plate is thus suitable for a large number of possible LED configurations. There are many convex lenses due to the small pitch and the way they merge at their bases to fill the active area.

Figure 11:
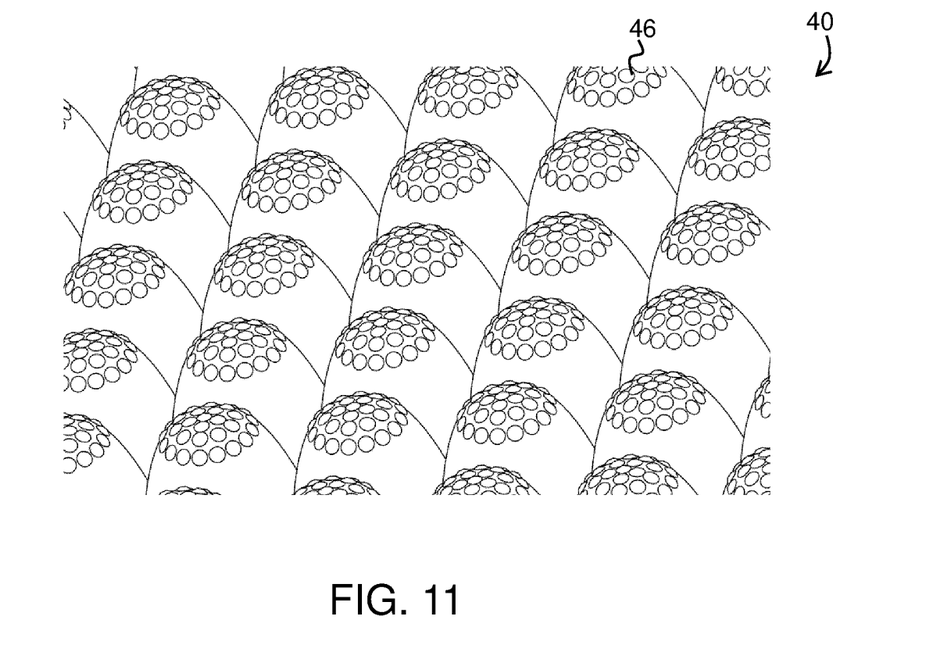
FIG. 11 shows a perspective view of the top surface of the lens plate.

FIG. 11 shows a perspective view of the top surface of the lens plate 40. It shows the square grid structure with microstructures 46 on the top portions of the convex lenses.

Figure 12:
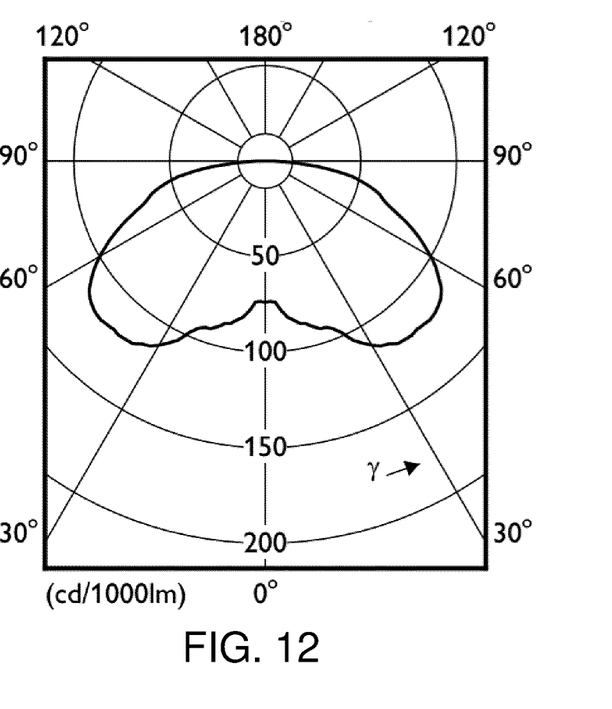
FIG. 12 shows a simulation of the performance of the lens plate provided over an array of mid power LEDs, as a polar intensity diagram.

FIG. 12 shows a simulation of the performance of the lens plate provided over an array of mid power LEDs, and shows a polar intensity diagram. It shows that the desired batwing intensity distribution can be achieved.

The microstructure is optional. In the example above, it is provided on the top surface of each convex lenses. However, there may instead be a microstructure on the common substrate, or there may be microstructures on both surfaces.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lighting device comprising:
an array of LEDs; and
a lens plate having an array of convex lenses, each convex lens having a top portion which forms a light input surface for facing a light source and a base which forms a light exit surface, a microstructure being formed at a central region of each top portion, each microstructure having an array of microlenses, and the base being positioned on or defining a substrate common to the array,
wherein each convex lens has a diameter D at the base and a height H from the base to its top portion such that H/D>0.85, the height is in a range of 1 mm to 4 mm, and each convex lens has a section curve that includes an oval line, a Bezier curve, a parabola, or a polynomial aspherical curve;
wherein a light output surface of each LED of the array of LEDs faces the top portions of the convex lenses of the lens plate;
wherein the LED array has a pitch between the LEDs in a range of 0.5 mm to 3 mm, and/or a distance along an optical axis between the light output surface of the LEDs and the top portion of the convex lenses is in a range of 3 mm to 7 mm.

2. The lighting device of claim 1, wherein each convex lens has a focal point between the top portion and the base.

3. The lighting device of claim 1, wherein each microstructure is diffusive or scattering.

4. The lighting device of claim 1, wherein the base of each convex lens and the common substrate are flat.

5. The lighting device of claim 1, wherein the top portion of each convex lens forms a projection which is rotationally symmetric about an optical axis.

6. The lighting device of claim 1, wherein the lenses of the array of convex lenses fully occupy an active area of the lens plate, and the lenses have a pitch in a range of 0.5 mm to 5 mm; wherein the active area is an area of the lens plate intended for beam shaping the light output from a light source.

7. The lighting device of claim 1, wherein the bases of the convex lenses merge together.

8. The lighting device of claim 1, wherein the lens plate comprises a microstructure formed at a central region of each top portion, wherein the microstructure extends over an area which subtends a half angle in a range of 10 to 15 degrees from a point on a plane of the output surfaces of the LEDs, along the optical axis of the convex lens.

9. The lighting device of claim 1, wherein:
less than 15% of the light from the LED array exit with an angle in a range of 0 to 30 degrees;
more than 70% of the light from the LED array exit with an angle in a range of 30 to 70 degrees; and
5% to 20% of the light from the LED exit with an angle in a range of 70 to 90 degrees.

10. The lighting device of claim 1, the lens plate has a thickness in a range of 1.5 mm to 5 mm, wherein the thickness of the lens plate includes the height H of the convex lenses and a thickness of the substrate.

11. The lighting device of claim 1, wherein each convex lens has a section curve having a polynomial aspherical curve.

12. A lighting device comprising:
an array of LEDs; and
a lens plate having an array of convex lenses, each convex lens having a top portion which forms a light input surface for facing a light source and a base which forms a light exit surface, a microstructure being formed at a central region of each top portion, each microstructure having an arrangement of embedded particles, and the base being positioned on or defining a substrate common to the array,
wherein each convex lens has a diameter D at the base and a height H from the base to its top portion such that H/D>0.85, the height is in a range of 1 mm to 4 mm, and each convex lens has a section curve that includes an oval line, a Bezier curve, a parabola, or a polynomial aspherical curve;

wherein a light output surface of each LED of the array of LEDs faces the top portions of the convex lenses of the lens plate;

wherein the LED array has a pitch between the LEDs in a range of 0.5 mm to 3 mm, and/or a distance along an optical axis between the light output surface of the LEDs and the top portion of the convex lenses is in a range of 3 mm to 7 mm.

* * * * *